United States Patent [19]
Hutton

[11] Patent Number: 5,988,203
[45] Date of Patent: Nov. 23, 1999

[54] TWO-PIECE MANIFOLD

[76] Inventor: Peter B. Hutton, 2024 26 A Street S.W., Calgary, Alberta, Canada, T32C1

[21] Appl. No.: 08/941,951

[22] Filed: Oct. 1, 1997

[51] Int. Cl.⁶ .................................................. F16K 11/20
[52] U.S. Cl. .......................... 137/271; 137/884; 137/597
[58] Field of Search .................................... 137/884, 597, 137/557, 269, 271

[56] References Cited

U.S. PATENT DOCUMENTS

| | | |
|---|---|---|
| Re. 34,610 | 5/1994 | Miller et al. . |
| D. 287,827 | 1/1987 | Broden . |
| D. 297,315 | 8/1988 | Pierce et al. . |
| D. 317,266 | 6/1991 | Broden et al. . |
| D. 318,432 | 7/1991 | Broden et al. . |
| 3,564,923 | 2/1971 | Nudd, Jr. et al. . |
| 3,596,680 | 8/1971 | Adams . |
| 3,618,390 | 11/1971 | Frick . |
| 3,653,405 | 4/1972 | Nelson . |
| 3,747,637 | 7/1973 | Mollere ................................. 137/271 |
| 3,765,441 | 10/1973 | Chang ................................... 137/271 |
| 3,768,511 | 10/1973 | Bias . |
| 3,817,283 | 6/1974 | Hewson . |
| 4,182,362 | 1/1980 | Hewson et al. . |
| 4,193,420 | 3/1980 | Hewson . |
| 4,215,721 | 8/1980 | Hetherington et al. . |
| 4,281,683 | 8/1981 | Hetherington et al. . |
| 4,319,492 | 3/1982 | Hewson et al. . |
| 4,321,261 | 3/1982 | Elmer . |
| 4,466,290 | 8/1984 | Frick . |
| 4,494,568 | 1/1985 | Young . |
| 4,602,657 | 7/1986 | Anderson, Jr. et al. . |
| 4,672,728 | 6/1987 | Nimberger . |
| 4,726,399 | 2/1988 | Miller . |
| 4,738,276 | 4/1988 | Adams . |
| 4,745,810 | 5/1988 | Pierce et al. . |
| 4,798,089 | 1/1989 | Frick et al. . |
| 4,833,922 | 5/1989 | Frick et al. . |
| 4,865,360 | 9/1989 | Adams . |
| 4,879,912 | 11/1989 | Suckow . |
| 4,921,072 | 5/1990 | Divisi . |
| 4,977,917 | 12/1990 | Adams . |
| 4,993,754 | 2/1991 | Templin, Jr. . |
| 5,036,884 | 8/1991 | Miller et al. . |
| 5,048,569 | 9/1991 | Stoll et al. . |
| 5,117,867 | 6/1992 | Adams . |
| 5,209,258 | 5/1993 | Sharp et al. . |
| 5,248,167 | 9/1993 | Petrich et al. . |
| 5,272,646 | 12/1993 | Farmer . |
| 5,277,224 | 1/1994 | Hutton et al. . |
| 5,303,733 | 4/1994 | Nelson . |
| 5,341,846 | 8/1994 | Framberg ................................. 137/884 |
| 5,449,294 | 9/1995 | Rench et al. . |
| 5,494,071 | 2/1996 | Bell et al. . |
| 5,586,570 | 12/1996 | Fukano .................................... 137/271 |

FOREIGN PATENT DOCUMENTS

| | | |
|---|---|---|
| 1008701 | 4/1977 | Canada . |
| 2086535 | 5/1982 | United Kingdom . |
| 2271164A | 4/1994 | United Kingdom . |
| WO 93/05329 | 3/1993 | WIPO . |
| WO 96/18091 | 6/1996 | WIPO . |

OTHER PUBLICATIONS

Brochure: *Manifolds.* Century Valve Ltd., Calgary, Alberta, Canada. Admitted prior art.
Flier: *DA Minimatic Three Valve Manifold.* DA Mfg. Co., Tulia, Texas. Jun. 20, 1978.
Brochure: *Instrumentation Manifolds: The World Standard.* Bulletin 4190. Parker Fluid Connections. Dec. 1992.
Flier: "*Safti–fold®*" 3 *Valve Unimount.* Admitted prior art.

*Primary Examiner*—Denise L. Ferensic
*Assistant Examiner*—Ramyar Farid
*Attorney, Agent, or Firm*—Browning Bushman

[57] ABSTRACT

A two-piece, modular valve manifold adapted to be positioned between a main flowline and a pressure sensor to control fluid flow from the main flowline to the sensor, the manifold comprising a first module that adapts to a pressure sensor, such as a differential pressure transmitter, and a second module that is connected to a source of process fluid, the second module containing a block valve system, the first module containing an equalizer valve system and a vent valve system, the modules being connected together whereby process fluid can be transferred through the first module to the second module and ultimately, to the pressure sensor.

42 Claims, 7 Drawing Sheets

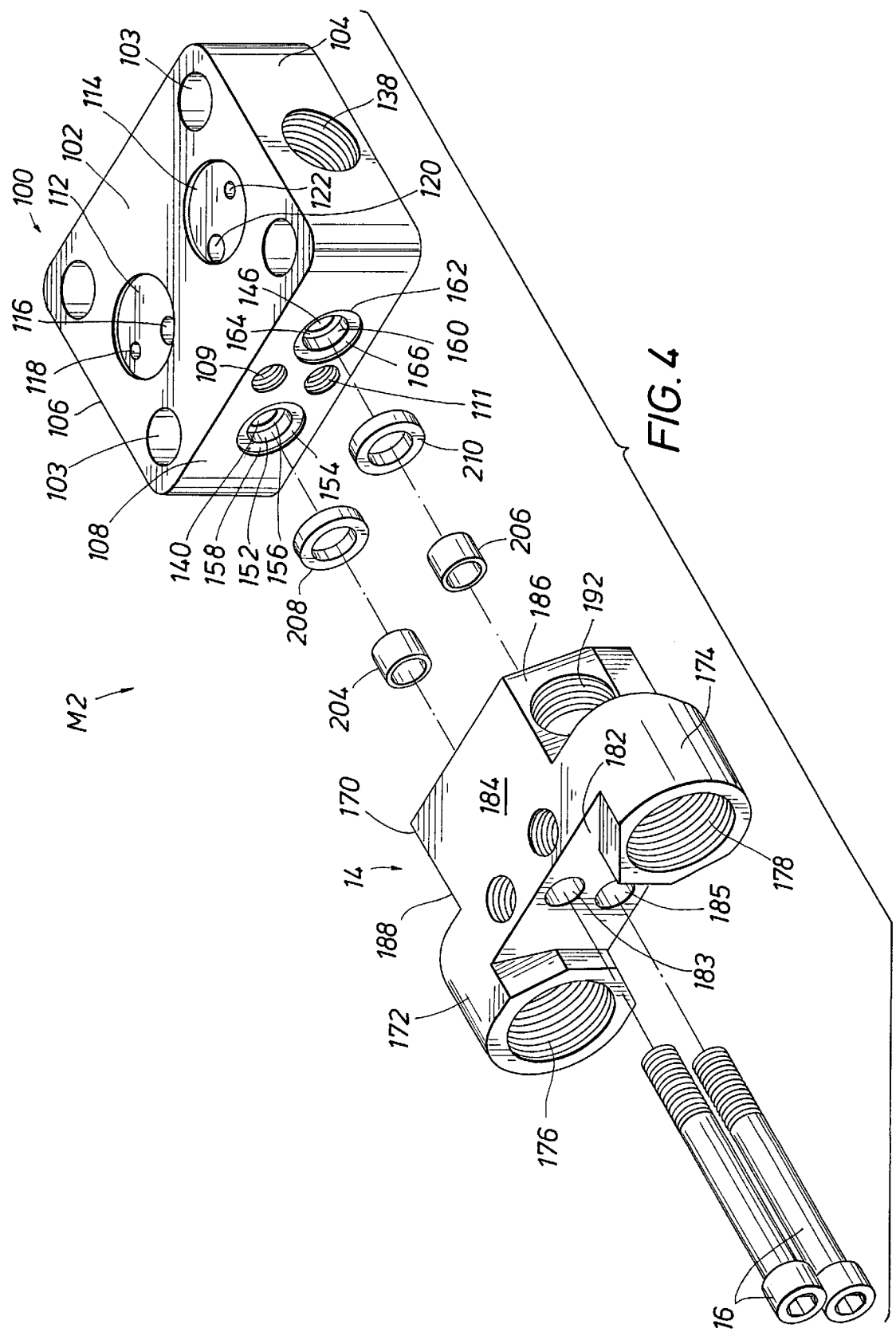

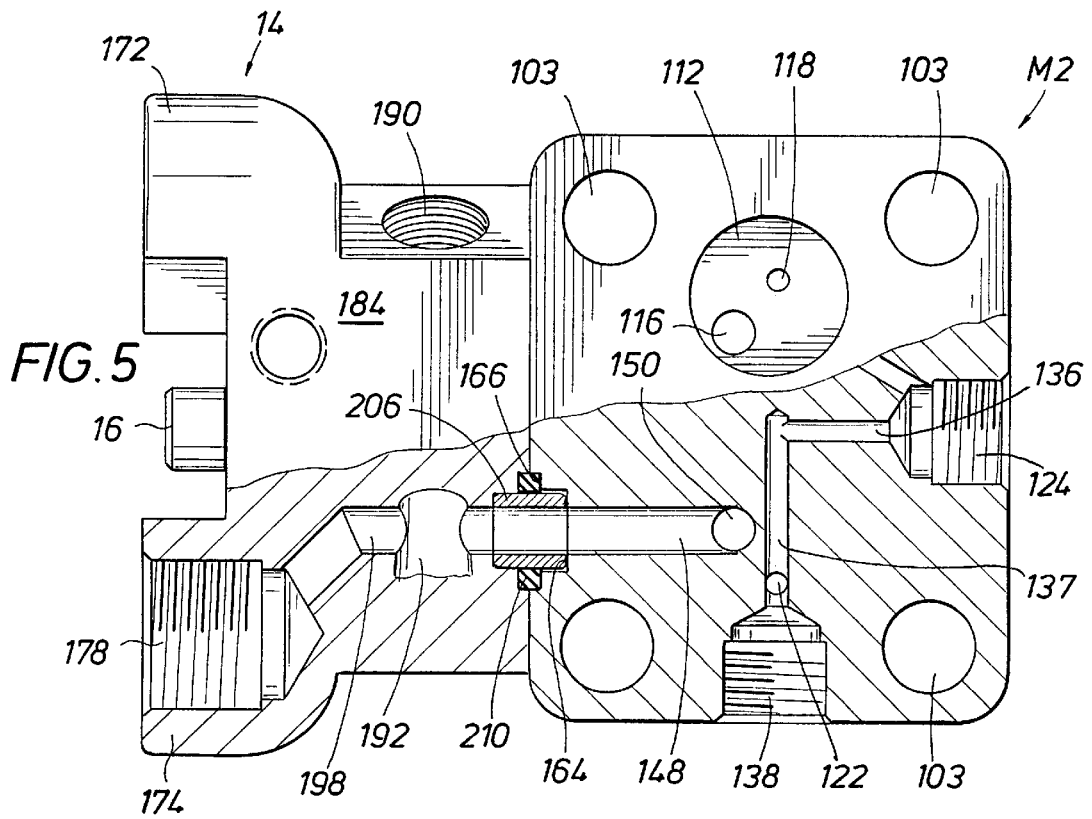
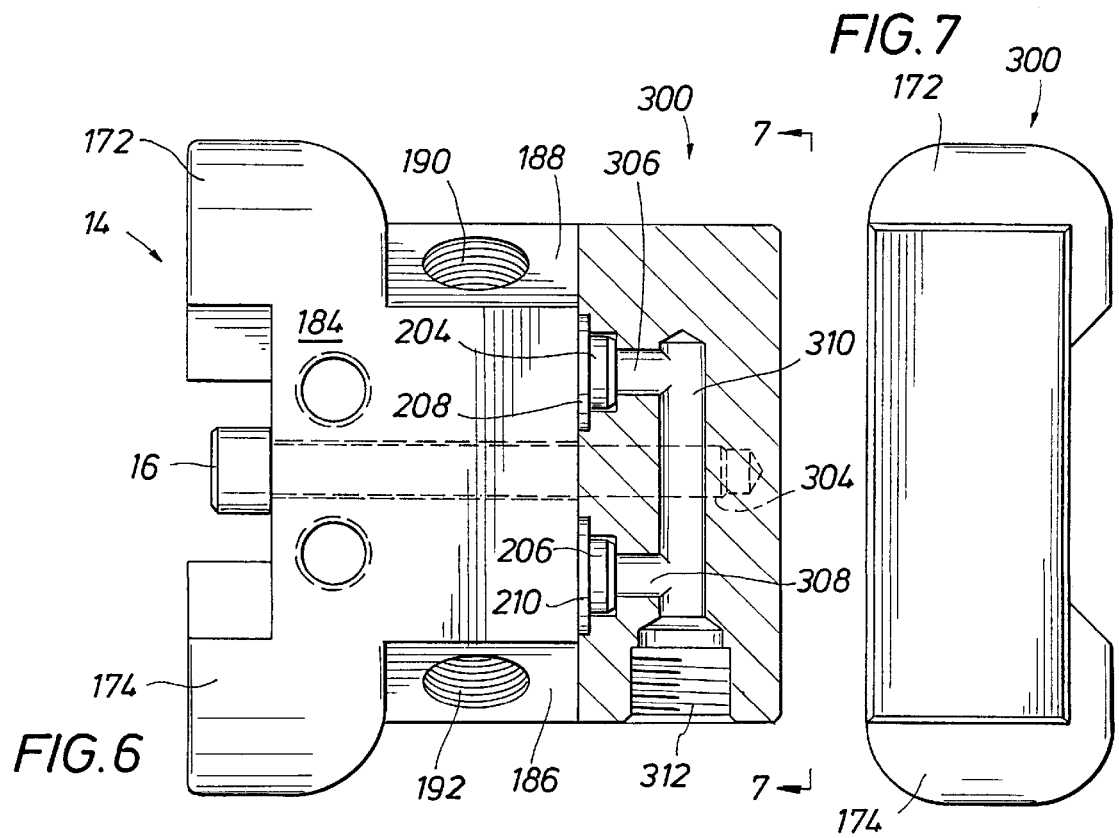

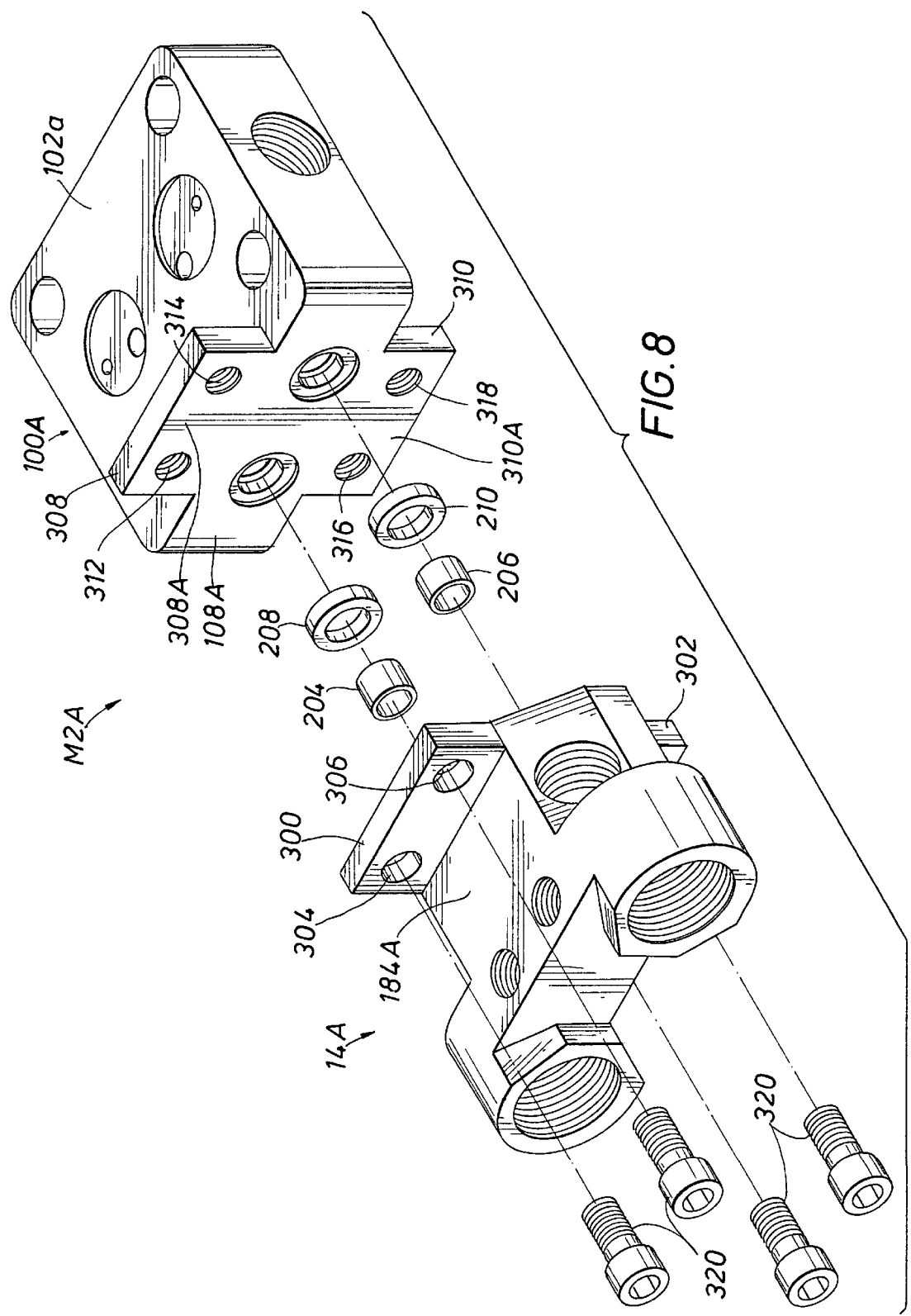

TWO-PIECE MANIFOLD

BACKGROUND OF THE INVENTION

1. Field of the Invention

The present invention relates to a valve manifold for controlling fluid flow between a main flowline and a pressure sensor and, more particularly, to such a valve manifold of modular, two-part construction.

2. Description of the Prior Art

It is often desirable to determine the flow or pressure of a fluid, e.g., a gas, through a main flowline, e.g., a pipeline. Typically, this can be accomplished by a flow restriction disposed in the main flowline, there being pressure taps on each side of the restriction for obtaining high and low pressure fluid pressures. Such a flow restriction may comprise an orifice plate, a flow nozzle, a venturi tube, etc. The high and low pressures taken from opposed sides of the flow restriction in the main flowline are detected by a pressure sensor/transmitter assembly that measures and transmits the measured pressures or pressure differential by a suitable mechanical or electronic signal or the like to a remote location, e.g., a control room, where the pressure or pressure differential may be monitored and/or recorded by an operator.

Typically, a valve manifold is mounted between the main flowline and the pressure sensor. The manifold is used to control flow to the pressure sensor while permitting blocking, venting, zero checks, and calibration. The manifold typically includes a plurality of valves, each movable between open and closed positions relative to a flow pathway in the manifold so as to control the flow of fluid through the pathway.

Fluid pressure sensors/transmitters, particularly such sensor/transmitters of the differential pressure type typically employ diaphragms in both the low and high pressure inlets to the pressure sensors to detect the high and low pressures to which they are exposed. One type of pressure transmitter, commonly referred to as the "coplanar transmitter" is disclosed in U.S. Pat. No. 4,466,290 to Frick, herein incorporated by reference. As shown in the Frick patent, the diaphragms have fluid facing sides, the peripheries of which are defined by rims, the planes defined by the rims being coplanar with respect to one another. In any event, the diaphragms, as seen in the Frick patent, are closely adjacent the face of the transducer in which they are disposed.

Diaphragms that are used in sensors transmitters such as the sensor transmitter disclosed in the Frick patent are extremely fragile, expensive, and difficult to install in the pressure sensor. Further, in cases where the valve manifold and the pressure sensor are directly coupled to one another, the diaphragms are closely positioned to the face of the manifold to which the pressure sensor is attached. In these direct coupled manifold/pressure sensor assemblies, one face of the manifold, generally referred to as the instrument face, sealingly abuts a face of the pressure sensor, as, for example, face 53 of transducer 14 shown in the Frick patent. The instrument face of the manifold is provided with a low pressure outlet and a high pressure outlet, both of which are relatively shallow, cylindric cavities. The cylindric cavities are in register with the low pressure and high pressure inlets, respectively, in the face of the pressure sensor sealingly abutted by the instrument face of the manifold. Accordingly, when the manifold and pressure sensor are mated, the cylindric cavities cooperate with the diaphragms to form generally cylindric chambers of a small cylindrical height relative to the cylindrical diameter.

Not infrequently, it is necessary for the transmitter to be repaired, necessitating its removal from the manifold. Obviously, when the transmitter is removed from the manifold, and in the usual case, the diaphragms are exposed and, being of such fragile nature, readily susceptible to damage.

One way of avoiding field damage of the diaphragms is to remove the entire manifold/pressure sensor transmitter assembly from the field. However, this requires an additional means of controlling the process fluids emanating from the orifice plate assembly or the like. Typically, this would involve an additional set of block valves installed in the feed lines from the orifice plate assembly so that flow from the main pipeline can be stopped when the manifold/transmitter assembly is removed.

Although not necessary, it is desirable that the transmitter be mounted vertically, i.e., that the diaphragms be disposed generally horizontally and facing downwardly. Prior art solutions to this problem of orienting the transmitter involve various complex passageway constructions within the manifold that will effectively accomplish a "right-hand turn" of the passageway within the manifold body. Frequently, this requires passageways drilled at various angles, which requires expensive tooling and precise machining. Moreover, these complex passageway systems often require "construction holes," which are simply bores in the manifold body that allow certain passageways to be drilled and connected with other passageways interiorly of the manifold. These construction holes, even though they are later plugged, are a potential source of leakage. Alternately, they frequently provide dead spaces within the manifold body where liquid and gas bubbles can collect. Thus, elimination of the construction holes eliminates one possible source of leakage and liquid collection or pooling in the manifold body.

SUMMARY OF THE INVENTION

It is therefore an object of the present invention to provide an improved valve manifold.

Another object of the present invention is to provide a valve manifold of modular, two-piece construction for use with pressure sensors of the differential pressure type.

Yet a further object of the present invention is to provide a valve manifold of the type wherein one portion or module of the manifold that can be used to block the process fluids can be separated from a second portion or module of the manifold that remains attached to the transmitter.

Still a further object of the present invention is to provide a modular, two-piece valve manifold that permits vertical orientation of the transmitter using a relatively simple passageway system that can be easily drilled in the manifold body portion.

The above and other objects of the present invention will become apparent from the drawings, the description given herein, and the appended claims.

In accordance with the present invention, there is provided a modular, two-piece valve manifold adapted to be positioned between a main flowline and a pressure sensor to control fluid flow from the main flowline to the pressure sensor. The manifold of the present invention includes a first module that has an instrument face and a peripheral wall, the peripheral wall including a first mating surface, a high pressure plenum, and a low pressure plenum being formed in the instrument face, a high pressure outlet opening into the high pressure plenum and a low pressure outlet opening into the low pressure plenum. There is an equalizer valving system carried by the first module for selectively controlling fluid communication between the high pressure outlet and the low pressure outlets in the high pressure and low pressure plenums, respectively. The first module also carries a vent valving system for selectively venting fluid from the high pressure and low pressure plenums exteriorly of the first module. A high pressure inlet and a low pressure inlet are formed in the first mating face, the high pressure inlet being in open, fluid communication with the high pressure outlet in the high pressure plenum, the low pressure inlet being in open, fluid communication with the low pressure outlet in the low pressure plenum. The manifold further includes a second module having a second mating surface adapted to mate with the first mating surface on the first module, the second module including a high pressure process fluid inlet and a low pressure process fluid inlet. A high pressure process fluid outlet and a low pressure process fluid outlet are formed in the second mating surface, the high pressure process fluid inlet and the high pressure process fluid outlet being selectively in fluid communication, the low pressure process fluid inlet and the low pressure process fluid outlet likewise being selectively in fluid communication. The high pressure and low pressure process fluid outlets are in register with the high pressure and low pressure inlets, respectively, formed in the first mating face on the first module. A high pressure block valve is disposed in the second module for selectively controlling fluid flow from the high pressure process fluid inlet to the high pressure process fluid outlet while a low pressure block valve is disposed in the second module for selectively controlling fluid flow from the low pressure process fluid inlet to the low pressure process fluid outlet. Seals effect first fluid-tight communication between the high pressure process fluid outlet and the high pressure inlet and second fluid-tight communication between the low pressure process fluid outlet and the low pressure inlet, which, as will be appreciated, also seal the high pressure outlet/inlet from the low pressure outlet/inlet. The manifold also includes a connector securing the first and second modules together.

BRIEF DESCRIPTION OF THE DRAWINGS

The invention can be understood with reference to the accompanying drawings wherein:

FIG. 4 is an exploded and front perspective view of the manifold shown in FIG. 3 with the connection and sealing elements being shown;

FIG. 5 is a top, planar view, partly in section, of the manifold shown in FIGS. 3 and 4 with the two modules connected and sealed;

FIG. 6 is a top, planar view, partly in section, showing the block valve module of the modular manifold of the present invention with a blanking plate attached; and FIG. 7 is an end, elevational view taken along the lines 7—7 of FIG. 6.

FIG. 8 is an exploded and front perspective view similar to FIG. 4 showing an alternate connector assembly.

DESCRIPTION OF THE PREFERRED EMBODIMENTS

The modular manifold of the present invention is comprised of two body portions, a first module that can be considered a transmitter-mounting portion or instrument platform, and a second module that can be considered a block valve body portion or process interface. Indeed, a feature of the invention is that the process interface isolates the block valves as a separate component of the manifold. The second module is common to numerous different embodiments of the invention, two of which are shown, the two shown embodiments differing in the structure of the first module or transmitter-adaptable body portion of the manifold. However, it will be apparent that the second module can be used with other types of first modules, including a first module that incorporates pressure- and/or temperature-sensing devices, or other types of sensors, and a transmitter.

Figure 1:
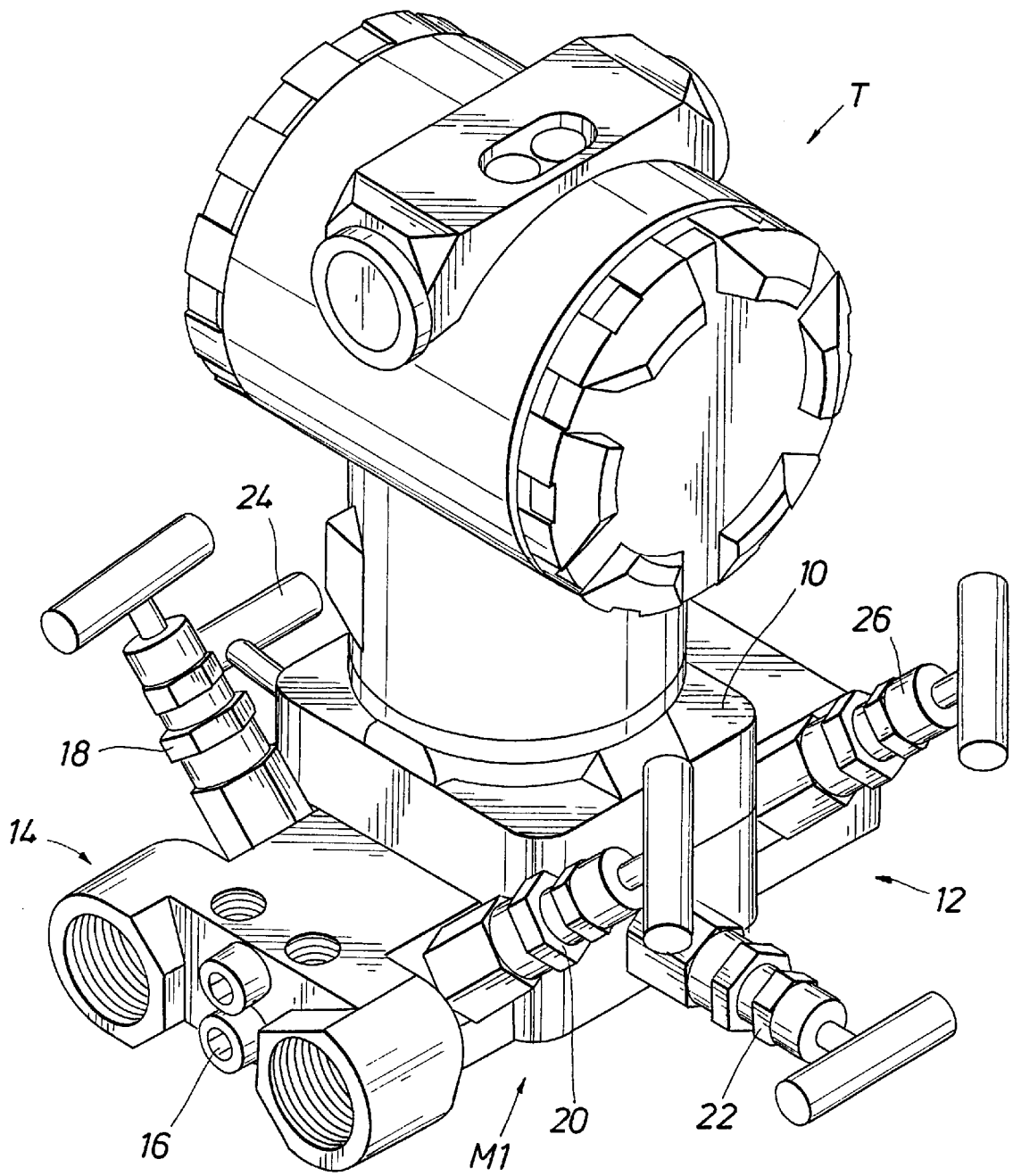
FIG. 1 is a top and front perspective view showing a first embodiment of the modular, two-piece manifold of the present invention attached to a differential transmitter.

With reference first to FIG. 1, there is shown a first embodiment of the manifold of the present invention designated generally as $M_1$ with a typical differential pressure transmitter shown generally as T secured to manifold $M_1$ by means of bolts (not shown) that are received in threaded bores (not shown), the bolts extending through throughbores in the manifold M, which register with the threaded bores in the mounting flange 10 of transmitter T. Manifold $M_1$ comprises a first module shown generally as 12 and a second module shown generally as 14. While not shown, it will be appreciate by those skilled in the art that module 14 is attached to a suitable mounting system associated with the flowline/flow restrictor such that taps on each side of the flow restrictor can be connected to module 14. To this end, module 14 is provided with threaded bores 17, shown best in FIG. 4, to permit module 14 to be secured to a mounting bracket or the like associated with the flow restrictor assembly in a main flowline, flow through which is being determined. As will be seen in greater detail hereafter in one embodiment, module 12 is secured to module 14 by means of bolts 16 that extend through throughbores in module 14 and are received in registering, threaded bores in module 12. Module 14 carries high pressure and low pressure block valves 18 and 20, respectively, while module 12 carries two equalizer valves 22 and 24, as well as two vent valves, only one of which, vent valve 26, is shown in FIG. 1. It will be appreciated by those skilled in the art that the various types of valves and vent nipples hereinafter referred to and used in the manifold of the present invention are of conventional construction and need not be described in detail here. For example, valves such as ball valves, plug valves, and globe valves may be used as the various valves. Additionally, the valves employed may be of the so-called soft seat or metal seated type, depending upon the environment to which the manifold of the present invention is subjected.

Figure 2:
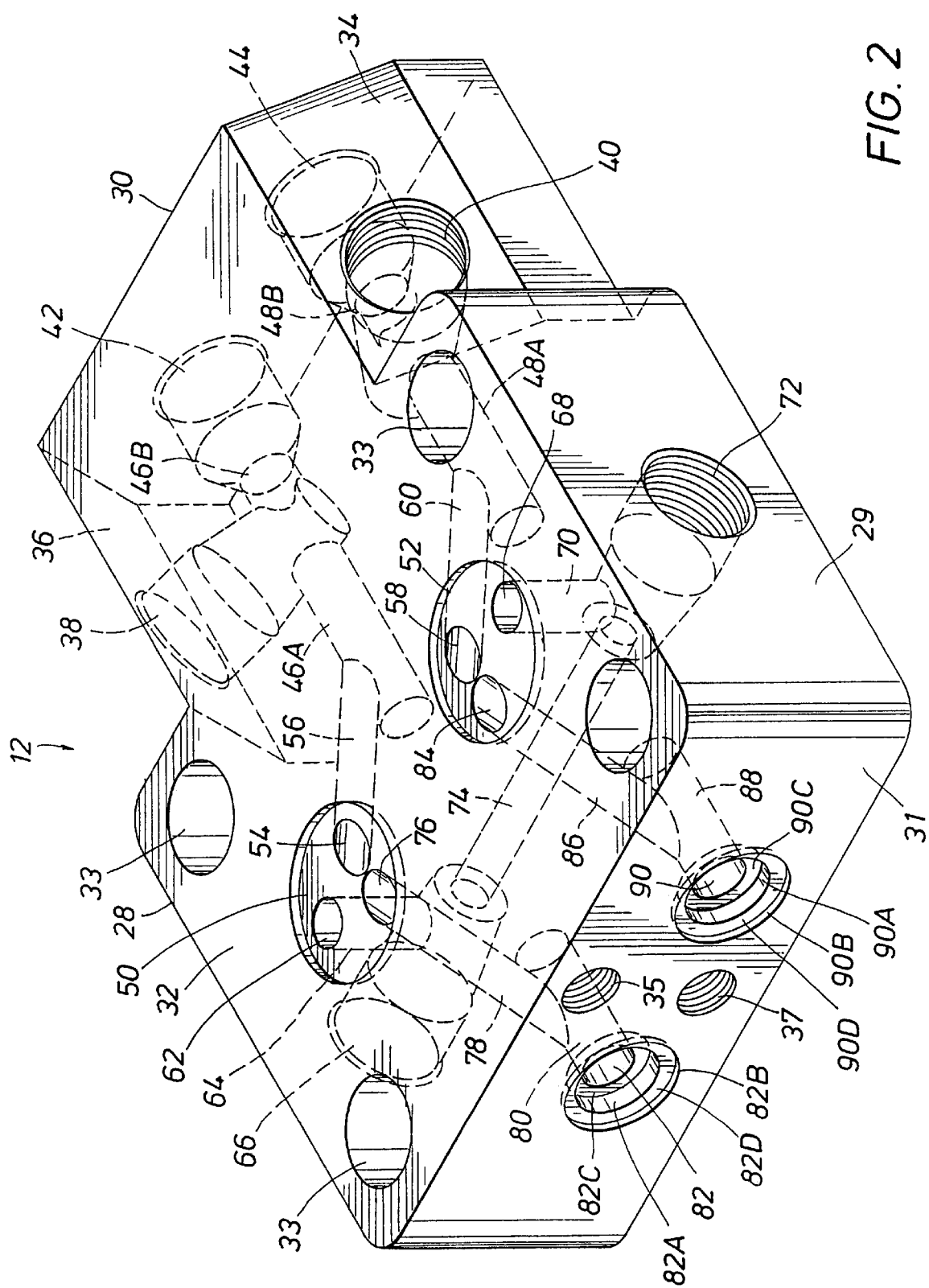
FIG. 2 is a top and front perspective view showing one module of the modular manifold shown in FIG. 1 and showing the internal porting, the valves having been removed for clarity.

With reference now to FIG. 2, there is shown an isometric view of the first module 12 of manifold embodiment $M_1$. It can be seen that module 12 is preferably monolithic in nature and is generally machined or otherwise fabricated from a single workpiece of a suitable material, e.g., stainless steel. Module 12 includes a main body segment 28 and a neck body segment 30. Module 12 further includes an instrument face 32 that is generally planar, spaced from, and parallel to an opposed face (not shown). Face 32 forms a common surface of both main body segment 28 and neck body segment 30. Face 32 and the opposed face are adjoined by a peripheral wall including a mating surface 31, a side wall 29, and an opposed, parallel side wall (not shown). Main body segment 28 is generally rectangular, while neck body segment 30 is provided with chamfered, neck body segment surfaces 34 and 36, surfaces 34 and 36 being planar and forming equal, obtuse angles with instrument face 32. Neck body segment 30 is provided with a threaded, high pressure vent valve pocket 38 and a threaded, low pressure vent valve pocket 40, vent valve pockets 38 and 40 being formed in chamfered surfaces 36 and 34, respectively. Vent valve pocket 38 is in fluid communication with a high pressure vent outlet 42 while low pressure vent valve pocket 40 is in fluid communication with a low pressure vent outlet 44. A high pressure vent passageway comprising passageway segments 46A and 46B intersects vent valve pocket 38 and opens into vent outlet 42 while a low pressure vent valve passageway comprising passageway segments 48A and 48B intersects low pressure vent valve pocket 40 and opens into low pressure vent outlet 44. It will thus be appreciated that when suitable valves, such as valve 26, are received in vent valve pockets 38 and 40, fluid communication between passageway segments 46A and 46B can be selectively controlled, and likewise, fluid communication between passageway segment 48A and 48B can be selectively controlled.

Formed in instrument face 32 of module 12 is a high pressure plenum 50 and a low pressure plenum 52. As seen, plenums 50 and 52 are generally shallow, cylindric cavities formed in instrument face 32. A high pressure vent port 54 opens into high pressure plenum 50, vent port 54 being connected to high pressure vent passageway segment 46A by an angled passageway 56. Likewise, a low pressure vent port 58 opens into low pressure plenum 52 and is connected to low pressure vent passageway segment 48A by means of an angled passageway 60. It will thus be seen that fluid present in plenum 50 can be selectively vented therefrom by opening a suitable valve received in valve pocket 38A, which places vent outlet 42 in open communication with vent port 54. In a similar fashion, any fluid present in low pressure plenum 52 can be vented externally of module 12 by opening valve 26, received in valve pocket 40, thereby placing vent port 52 in open communication with vent outlet 44.

A high pressure equalizer port 62 also opens into plenum 54. Port 62 is connected by a passageway 64 to threaded, high pressure equalizer valve pocket 66, formed in the side wall of main body segment 28, which is generally parallel to side wall 29 of main body segment 28. In like fashion, a low pressure equalizer port 68 opens into low pressure plenum 52 and is connected by passageway 70 to threaded, low pressure equalizer valve pocket 72, formed in side wall 29 of main body segment 28. High pressure equalizer valve pocket 66 and low pressure equalizer valve pocket 72 are interconnected by an equalizer passageway 74, which is generally coaxial with valve pockets 66 and 72, passageways 66 and 70 being generally perpendicular to passageway 74.

A high pressure outlet 76 opens into plenum 50 and is connected by means of a high pressure outlet passageway 78 to a high pressure stub passageway 80 that opens into a high pressure inlet 82, formed in the mating surface 31 of module 12. In like manner, a low pressure outlet 84 opens into plenum 52 and is connected by low pressure outlet passageway 86 to low pressure stub passageway 88, which opens into low pressure inlet 90, also formed in mating surface 31 of module 12.

Main body segment 28 is provided with four, peripherally spaced throughbores 33 through which suitable bolts extend in the well-known manner to secure module 12 to the mounting flange 10 of a suitable transmitter, such as shown in FIG. 1. Additionally, threaded blind bores 35 and 37 are formed in first mating surface 31 for a purpose to be hereafter described.

High pressure inlet 82 is coaxial with a first counterbore 82A and a second, larger counterbore 82B, counterbore 82A serving to form an annular shoulder 82C, counterbore 82B serving to form an annular shoulder 82D, all for a purpose to be described hereafter. Likewise, low pressure inlet 90 is coaxial with a first counterbore 90A and a second, larger counterbore 90B, counterbore 90A serving to form an annular shoulder 90C, counterbore 90B serving to form an annular shoulder 90D, all for a purpose to be described hereafter.

It will thus be seen that high pressure fluid entering module 12 via high pressure inlet 82 will enter high pressure plenum 50, where its pressure can be detected, measured, and transmitted. Likewise, low pressure fluid entering module 12 via low pressure inlet 90 will flow into low pressure plenum 52, where its pressure can be detected, measured, and transmitted. With both vent valves closed and equalizer valves 22 and 24 closed, flow out of plenums 50 and 52 will be prevented. If it is desired to remove fluid from plenums 50 and 52, and assuming, as will be discussed hereafter, that the block valves in module 14 are closed, vent valve 26 and the other corresponding vent valve will be opened, allowing fluid from plenum 50 and 52 to be vented to vent outlets 42 and 44, respectively.

As noted above, module 12 contains two equalizer valves, i.e., valves 22 and 24. In order to effect zeroing of the transmitter, both equalizer valves 22 and 24 must be open in order to allow fluid communication between plenums 50 and 52. In this regard, it will be observed that with valve 22 (received in valve pocket 72) in the closed positions, no fluid communication is permitted between passageways 70 and 74. Likewise, with valve 24 (received in valve pocket 66) closed, no fluid communication is permitted between passageways 64 and 74. However, with both equalizer valves 22 and 24 open, plenums 50 and 52 are placed in open communication with one another via passageways 70, 74, and 64.

It is to be observed that the passageway system shown in module 12 is of relatively simple design with a minimum number of angled passageways being required. Note, for example, that except for angled passageways 56, 78, 60, and 86, all other passageways are drilled normal to planar surfaces formed exteriorly of module 12. Indeed, passageways 88, 48A, and 48B are generally coaxial with passageways 80, 46A, and 46B while passageways 80, 46A, and 46B are likewise generally coaxial. This greatly simplifies machining and obviates the necessity for expensive jigs, complex angle drilling, or other complex machining procedures.

Figure 3:
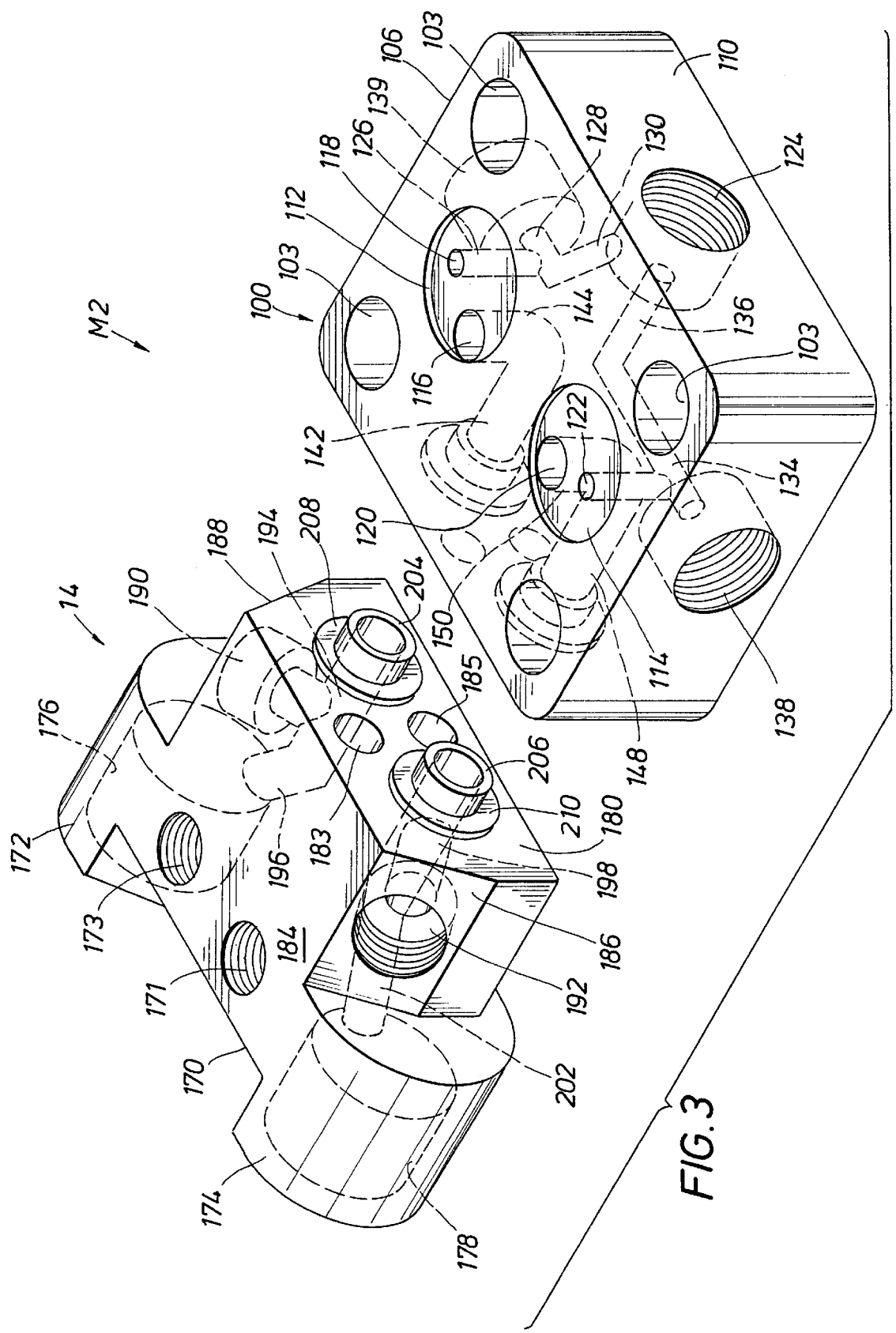
FIG. 3 is a top and rear perspective view showing another embodiment of the modular manifold of the present invention.

With reference now to FIGS. 3 and 4, there is shown another embodiment of the manifold of the present invention designated generally as $M_2$. The manifold shown in FIG. 3, while also of modular design, differs from the manifold shown in FIGS. 1 and 2 in that the first module 100 contains a single equalizer valve and two vent nipples or the like. As noted above, the second module 14 is identical to that shown in FIG. 1 with respect to the description of manifold $M_1$. With reference then to FIGS. 3 and 4, module 100, which is generally rectangular in configuration, monolithic in construction, and made, e.g., machined, from a suitable material such as stainless steel, has an instrument face 102 that is generally planar, opposed side walls 104 and 106, a front mating surface 108, and an opposed, generally parallel rear wall 110. Formed in instrument face 102 is a high pressure plenum 112 and a low pressure plenum 114, plenums 112 and 114 being generally shallow cylindric cavities. Opening into high pressure plenum 112 is a high pressure outlet 116 and a high pressure equalizer port 118. Opening into low pressure plenum 114 is a low pressure outlet 120 and a high pressure equalizer port 122. An equalizer valve pocket 124 is formed in the rear wall 110 of module 100. Equalizer valve pocket 124 is in selective fluid communication with equalizer port 118 via passageways 126, 128, and 130, passageway 130 opening into equalizer valve pocket 124. Likewise, equalizer valve pocket 124 is in selective, fluid communication with low pressure equalizer port 122 in plenum 114 via passageways 132, 134, and 136. Formed in side wall 104 of module 100 is a threaded low pressure, vent outlet 138 in open fluid communication with plenum 114 via passageways 134 and 132 that can be provided with a vent nipple or the like in the well-known manner. Likewise, a threaded, high pressure vent outlet 139 formed in side wall 106 of module 100 is in open fluid communication with plenum 112 via passageway 126 and 128. Outlet 139 can also be provided with a vent nipple or the like.

As best can be seen from FIG. 3, passageway 134 is generally coaxial with vent outlet 138 while passageway 136 is generally coaxial with equalizer valve pocket 124, passageways 134 and 136 being substantially at right angles to one another. Likewise, passageway 132, which communicates between plenum 114 and passageway 134, is generally at a right angle to passageway 134.

High pressure plenum 112 is in open fluid communication with high pressure inlet 140 formed in mating face 108 of module 100 via passageways 142 and 144, passageway 142 being generally coaxial with high pressure inlet 140, passageways 142 and 144 being generally at right angles to one another. Low pressure outlet 120 formed in plenum 114 is in open fluid communication with low pressure inlet 146 via passageways 148 and 150, passageway 148 being generally coaxial with low pressure inlet 146, passageways 150 and 148 being generally at right angles to one another.

Module 100 is provided with peripherally spaced throughbores 103 in the well-known manner through which threaded bolts can extend to be received in threaded bores in transmitter flange 10 in register with throughbores 103, whereby module 100 can be connected to transmitter T. It should be noted that the passageway system in module 100 is substantially contained within a parallelepiped defined by the throughbores 103 and, more specifically, a parallelepiped defined by instrument face 102, the opposed face (not shown) and four imaginary planes, respective ones of which are tangent to the outside peripheries of adjacent throughbores 103. The mating face 108 of module 100 is also provided with threaded bores 109 and 111 for a purpose to be described hereafter.

When in use, it will be appreciated that high pressure fluid entering module 100 via high pressure inlet 140 will pass via passageways 142 and 144 into high pressure plenum 112. Likewise, low pressure fluid entering module 100 via low pressure inlet 146 will pass via passageways 148 and 150 into low pressure plenum 114. It will be appreciated that with suitable vent nipples or the like disposed in vent ports 138 and 139, and when such vent nipples are in the closed position and further when an equalizer valve is present in equalizer valve pocket 124 and is in the closed position, high pressure fluid cannot pass out of high pressure plenum 112, and low pressure fluid cannot pass out of low pressure plenum 114. To effect equalization, the valve in equalizer valve pocket 124 is opened, thereby providing open fluid communication between high pressure plenum 112 and low pressure plenum 114 via the passageway system described above. To vent plenums 112 and 114, the vent nipples or valves in vent outlets 138 and 139 are opened, which then permits fluid in plenums 114 and 112, respectively, to vent to atmosphere.

With particular reference to FIG. 4, it can be seen that high pressure inlet 140 is coaxial with a first counterbore 152 and a second, larger counterbore 154, counterbore 152, and counterbore 154 effectively forming annular shoulders 156 and 158. Likewise, low pressure inlet 146 is coaxial with a first counterbore 160 and a second larger counterbore 162, thereby forming annular shoulders 164 and 166, seen best with reference to FIG. 5.

With reference now to FIGS. 3, 4, and 5, the second module 14 and its internal porting can be described. Second module 14, as modules 12 and 100, is monolithic in nature and generally machined from a single workpiece of a suitable material, e.g., stainless steel. Second module 14 comprises a main body section 170 from which protrude first and second lobes 172 and 174, lobe 172 defining a high pressure process fluid inlet 176 threaded in the usual fashion to be connected to the high pressure side of the main flowline/orifice plate assembly or the like. In like fashion, lobe 174 defines a threaded low pressure process fluid inlet 178 that can be connected in the usual fashion to the main flowline/orifice plate assembly or the like. Body 170 of module 14 defines a second, planar mating face 180 and an opposed, process side face 182. Body 170 includes a top, generally planar surface 184, a chamfered, planar side surface 186, and an opposed, chamfered, planar side surface 188, chamfered side surfaces 186 and 188 forming equal, obtuse angles with planar surface 184. Spaced threaded bores 171 and 173 extend through body 170 to permit module 14 to be connected to the orifice plate assembly or the like.

A high pressure block valve pocket 190 is formed in chamfered surface 188 while a low pressure block valve pocket 192 is formed in chamfered surface 186, pockets 190 and 192 being threaded for receipt of block valves, as is well-known to those skilled in the art and as shown as 18 and 20 in FIG. 1. As best seen in FIG. 3, valve pocket 190 intersects a passageway 194 that is drilled generally normal to planar mating surface 180. Passageway 194 connects with angled passageway 196, which is in open fluid communication with high pressure process fluid inlet 176. Accordingly, it can be seen that with a valve 18 disposed in valve pocket 190, high pressure process fluid entering module 14 via high pressure process fluid inlet 76 will flow through passageway 196 and, assuming that the valve 18 is open, through passageway 194 to exit through a high pressure outlet (not shown) in the face 180 of module 14. Likewise, valve pocket 192 intersects a passageway 198 that is generally normal to mating surface 180 and coaxial with low pressure outlet 200 (see FIG. 5) formed in mating face 180. Passageway 198 in turn communicates with angled passageway 202, which opens into low pressure inlet 178. Accordingly, low pressure fluid entering low pressure inlet 178 will flow through passageway 202 and, assuming that valve 20 is in the open position, will flow through passageway 198 and out outlet 200. It will be appreciated that when valves 18 and 20 are in the closed position, flow of process fluid from the main flowline/orifice plate assembly is prevented through module 14 and hence either manifold embodiment $M_1$ or $M_2$.

While as described, module 14 is provided with two block valves, i.e., block valves 18 and 20, it will be apparent that two or more block valves can be incorporated in each of the high pressure and low pressure passageway systems simply by extending the axial length of main body section 170 to accommodate additional valve pockets, such as valve pockets 190 and 192. Such additional block valves, while normally not necessary, may provide an extra safety feature when the two modules are separated from one another.

As with the case of modules 100 and 12, the passageway system in module 14 requires a minimum of complex, angled drilling. Passageways 194 and 198, as noted above, are coaxial with the process fluid outlets and normal to mating surface 180, requiring only that passageways 196 and 192 be angled.

The manifold of the present invention further includes first and second tubular sleeves 204 and 206 and first and second seal rings 208 and 210. As best seen with reference to FIG. 5, sleeves 206 and 204 are interference-fitted into low pressure process fluid outlet 200 and the corresponding high pressure process fluid outlet not shown. Indeed, module 14 is provided with counterbores in surrounding relationship to the process fluid outlets essentially the same as the counterbores described above with respect to the inlets of modules 12 and 100. To connect the two modules together in fluid-tight engagement, the sleeves 204 and 206 and seal rings 208 and 210 are first positioned in module 14 as shown in FIG. 3. In the case of manifold embodiment $M_1$, mating surfaces 31 and 180 are brought together such that sleeve 204 is received in counterbore 82A and sleeve 206 is received in counterbore 90A. This will also bring seal ring 208 into counterbore 82B and seal ring 210 into counterbore 90B. As seen, seal rings 208 and 210 are made of a polymeric material, such as a PTFE resin, or some other suitable deformable polymeric material, and have an axial thickness such that when the modules 14 and 12 are connected, the rings 208 and 210 will be compressed, i.e., the axial thickness of the rings 208 and 210 is greater than the distance between the shoulders against which they abut when the modules are connected. In any event, when the modules are thus mated, bolts 16 are then placed through bores 183 and 185 in module 14 and threaded into registering bores 35 and 37 in module 12. As the bolts 16 are tightened, the mating faces 180 and 31 are urged towards one another, and seal rings 208 and 210 become compressed and deformed such that they are in fluid-tight sealing engagement with sleeves 204 and 206, respectively, and the two modules of the manifold. In a similar manner, the manifold embodiment $M_2$ can be assembled. It is to be noted, particularly with reference to FIG. 5, that the counterbores in modules 100 and 12 that receive the sleeves 204 and 206 are slightly larger than the counterbores in module 14 that receive sleeves 204 and 206 such that the sleeves are slidably received in the respective counterbores of modules 12 and 100. Thus, when the modules are separated, the sleeves being in interference fit in the counterbores in module 14 will remain in place in module 14.

It will thus be seen that using the modular manifold of the present invention with a differential pressure transmitter such as the Rosemount Model 3051C differential pressure transmitter, marketed by Rosemount, Inc., Eden Prairie, Minn., which uses fragile diaphragms as pressure sensors, one can easily separate the manifold into two modules, module 12 in the case of embodiment $M_1$ or module 100 in the case of embodiment $M_2$, remaining with the pressure transmitter, thereby protecting the sensitive diaphragms. At the same time, module 14, which contains the block valves, can be used to shut off flow from the main flowline. To this end, and as described in greater detail hereafter, module 14 can be provided with a blanking plate or block, indicated generally as 300 on FIG. 6, that acts as a cover plate and that mates to mating surface 180. When in place, blanking plate 300 effectively would seal off flow out of passageways 194 and 198, thus further providing a safety measure in the event that the block valves were left in the open position. Details of construction and use of blanking plate 300 are described more fully hereafter.

It is to be observed that the manifold of the present invention is particularly user friendly. In this regard, note that the block valves 18 and 20, extending up from the chamfered surfaces, are conveniently angled upwardly for easy access. Likewise, with respect to the embodiment $M_1$ shown in FIG. 1, the vent valves are also angled upwardly for easy access. In particular, in the case of the manifold embodiment $M_1$, the upward angling of the block and vent valves leaves ample room for easy manipulation of the equalizer valves 22 and 24 disposed between the block and vent valves.

As noted, it is desirable in certain cases that when the two modules of the manifold are separated as described above, module 14 be provided with a suitable blanking or cover plate on the outlet such that if the block valves are inadvertently opened, there still will be no escape of process fluid. With reference then to FIG. 6, there is shown such a banking plate or block indicated generally at 300 that is generally rectangular in configuration and has a surface 302 that mates with mating surface 180 on module 14. Blanking plate 300 is provided with counterbores sized and spaced essentially the same as counterbores in modules 12 and 100 so as to receive seal rings 208 and 210 and sleeves 204 and 206. Additionally, blanking plate 300 is provided with threaded bores, only one of which is shown, for receipt of threaded bolts 16 so as to secure blanking plate 300 to module 14. It will be understood that when bolts 16 are tightened as described above with respect to assembling either manifold embodiment $M_1$ or $M_2$, seal rings 208 and 210 are forced into sealing engagement with module 14, blanking plate 300, and sleeves 204 and 206. Blanking plate 300 has a high pressure passageway 306 and a low pressure passageway 308 that are in register with the outlets in module 12 and generally perpendicular to and intersect a relief passageway 310 that is coaxial with a threaded port 312 in which can be received a vent nipple or the like to relieve any pressure bleeding through module 14. In addition to providing a means of safely venting process fluid in the event one of the block valves is accidentally opened, blanking plate 300 also serves the purpose of protecting sleeves 204 and 206 from damage when module 14 is separated from either module 12 or module 100.

With reference now to FIG. 8, there is shown another embodiment of the present invention depicting an alternate means of connecting the two modules together in fluid-tight engagement. While the embodiment of FIG. 8, shown generally as $M_{2A}$ will be described with respect to a module identical in porting to module 100 described above, it will be apparent that it can likewise be used with module 12 as well. With reference then to FIG. 8, second module 14A is identical, in all respects, to module 14 described above, with the exception that module 14A is not provided with throughbores 183 and 185, through which extend bolts 16, nor is first module 100A provided with threaded bores 109 and 111 to receive the threaded ends of bolts 16. Rather, module 14A is provided with a first flange 300, preferably monolithically formed with, and extending laterally outwardly from, surface 184A of module 14A. In like fashion, module 14A is provided with a second flange 302, preferably monolithically formed with, and extending laterally outwardly from, the surface (not shown) opposite surface 184A. Flange 300 is provided with spaced bolt holes 304 and 306, while flange 302 is likewise provided with spaced bolt holes not shown. Module 100A is provided with a third flange 308, preferably monolithically formed with, and extending laterally outwardly from, face 102A and a fourth flange 310, preferably monolithically formed with, and extending laterally outwardly from, the face (not shown) opposed to and generally parallel to face 102A. Third flange 308 is provided with threaded bores 312 and 314 while fourth flange is 310 is provided with threaded bores 316 and 318. It can be seen that the faces 308A and 308A, formed by flanges 308 and 310, respectively, are coplanar with mating surface 108A. Likewise, although not shown, but as will appreciated, first and second flanges 300 and 302 have planar surfaces that in turn are coplanar with mating surface 180 (see FIG. 3). In all other respects, modules 100A and 14A are identical to modules 100 and 14, respectively. To connect modules 14A and 100A, the mating faces are brought together such that bolt holes 304 and 306 are in register with corresponding threaded bores 312 and 314, respectively, and the corresponding bores in second flange 302 are in register with threaded bores 316 and 318 in fourth flange 310. Bolts 320 are then passed through bolt holes 304 and 306 in flange 300, and the corresponding bolt holes in flange 302 and threadedly received into threaded bores 312, 314, 316, and 318 until the mating faces of modules 100A and 14A are brought together in the manner described above with respect to modules 14 and 100.

As noted above, the use of the flanges 300, 302, 308, and 310 in conjunction with bolts 320 to assemble modules 100A and 14A can also be employed as a modification to connect modules 14 and 12 simply by providing module 12 with flanges similar to flanges 308 and 310.

It will be apparent, and it is one of the features of the present invention, that the process interface or second module can be used, in and of itself, to provide a process interface between a process line or main flowline and any other manifold, module, instrument, or manifold/instrument combination where the purpose is to sample fluid flow in a main flowline, e.g., a pipeline, on either side of a flow restriction disposed in the main flowline so that the differential pressure or temperature across the restriction can be measured. In short, the second module of the present invention provides a stand-alone valve system incorporating high and low pressure block valves and that can be readily attached, in a well-known manner, to taps into the flowline on either side of a flow restrictor disposed in the flowline. In this regard, it will be recognized that while the mating face of the second module, which is shown and described herein, is configured to mate with the two disclosed first modules, it can be configured to mate with other manifold module configurations. The process interface (second module) facilitates field installation and removal of differential pressure transducers/transmitters, thereby obviating any significant shutdown of the flowline during such installation and/or removal.

Figure 9:
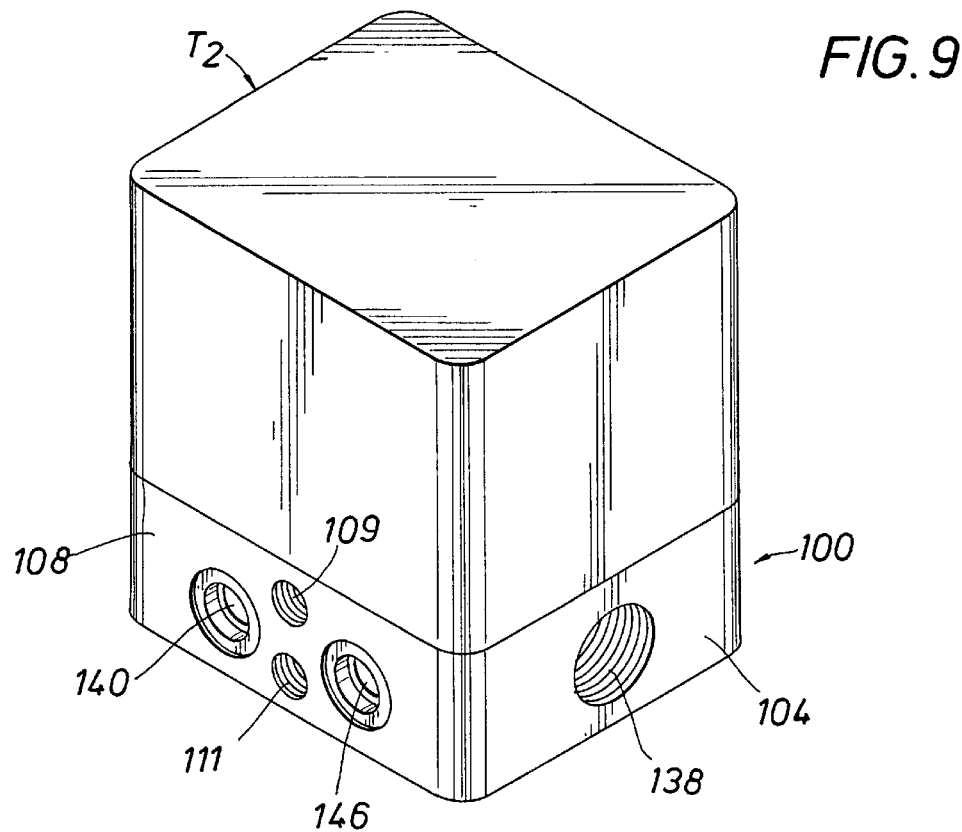
FIG. 9 is a front perspective view showing an integrated manifold/transmitter according to the present invention.
Figure 10:
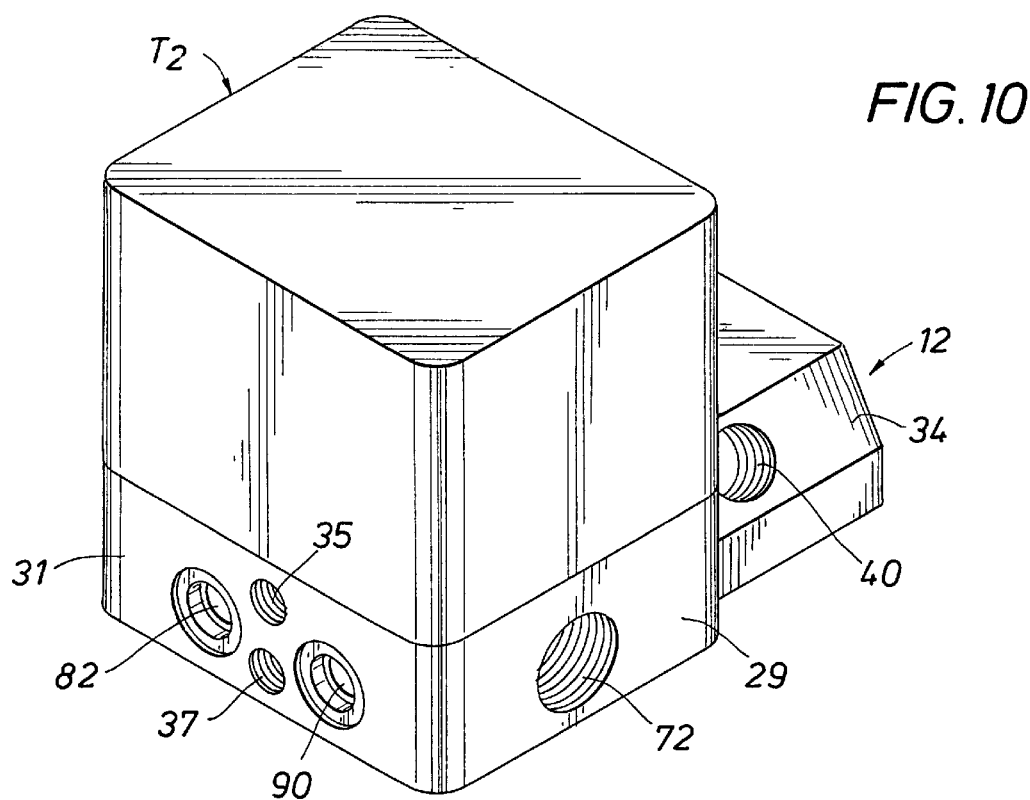
FIG. 10 is a view, similar to FIG. 9, showing another embodiment of an integrated manifold/transmitter according to the present invention.

Another unique feature of the manifold of the present invention resides in the fact that the first module or instrument platform can be constructed to include or incorporate various sensing devices or transducers to thereby provide an integrated or integral manifold/transducer, e.g., an integral manifold/differential pressure transducer using suitable pressure sensors. It is also contemplated that the instrument platform, in addition to incorporating a differential pressure transducer, is constructed to include a suitable differential pressure transmitter, whereby there is formed an integral manifold/differential pressure transducer/differential pressure transmitter assembly, i.e., a one-piece unit that accomplishes the functions of (a) directing fluid flow through appropriate valving, (b) detecting and measuring parameter (s) of the fluid, and (c) transmitting and/or recording the detected and measured parameter(s). Such a one-piece unit, as will be apparent from the description above, can be easily mated and unmated to the second module, i.e., module 14. Such one-piece units are shown in FIGS. 9 and 10. With reference first to FIG. 9, there is shown a transmitter $T_2$ of the differential pressure type forming an integral unit with first module embodiment 100, it being understood that first and second suitable pressure sensors are operatively connected between manifold portion 100 and transmitter portion $T_2$ to provide a differential pressure transducer.

Likewise, with reference to FIG. 10, there is shown first manifold configuration 12 formed as a one-piece unit with the transmitter $T_2$, it being understood that as, in the embodiment of FIG. 9, there are suitable pressure sensors operatively connected between module 12 and transmitter $T_2$ to detect and measure differential pressures. Suitable pressure sensors, well known in the art, that can be used in the embodiments shown in FIG. 9 include those shown in U.S. Pat. Nos. 3,618,390; 3,232,114; 3,295,326; 3,350,945; 3,372,594; 3,258,971; and 3,158,000, all of which are incorporated herein by reference. The circuitry employed in transmitter T2 can include, without limitation, circuitry such as disclosed in U.S. Pat. No. 3,854,039, incorporated herein by reference, but, as will be apparent to those skilled in the art, other known circuitry will also function satisfactorily. Operative couplings between the pressure sensors and the circuitry is disclosed, for example, in U.S. Pat. No. 4,466,290, incorporated herein by reference for all purposes. It will be readily apparent from FIGS. 9 and 10 that the present invention provides a unitized manifold/transducer/ transmitter that can be quickly and easily mounted to second module 14 to form a complete system for effecting differential pressure measurement and hence fluid flow through a main flowline, such as pipeline. The compact, unitized structure of the embodiments shown in FIGS. 9 and 10 makes it possible for end users to maintain backup units in the field that can be substituted for a failed unit by workers without a great deal of technical experience of such systems and that ensure that the transducers or sensors, which typically are very delicate and easily susceptible to damage, are protected.

As will be appreciated by those skilled in the art, the high pressure and low pressure transmitter plenums, e.g., plenums 112 and 114 in module 100, formed in the instrument face of the module 100 will be spaced and sized so as to be in operational register with the high pressure and low pressure inlets, respectively, to the pressure sensors or sensors/transmitter with which the manifolds of the present invention are used. In this regard, it will also be appreciated that desirably the instrument face, e.g., face 102, of the first module will mate directly to a sensor/transmitter as, for example, a coplanar transmitter such as the Rosemount Model 3051C differential pressure transmitter referred to above. Nonetheless, it will be appreciated that the modular manifold of the present invention could be readily adapted to mate to other types of sensors/transmitters. Thus, the spacing and configuration of the high pressure and low pressure transmitter plenums will be dictated by the nature of the sensors or sensors/transmitter to which the instrument face of the first module is mated.

Typically, high pressure inlet 176 and low pressure inlet 178 will be spaced apart on 2⅛" centers to accommodate standard NPT flowlines from the flowline/orifice plate assembly. However, it will be appreciated that other spacings of inlets 176 and 178 can be employed and that the spacing between inlets 176 and 178 may be the same as, or different from, the spacing (center-to-center) between the high pressure and low pressure transmitter plenums in the instrument face. Indeed, the unique two-piece construction of the manifold of the present invention admits of many variations in the spacing and configuration of the high pressure and low pressure inlets to module 12 and the high pressure and low pressure instrument plenums in the first module, i.e., module 12 or module 100.

As can be clearly seen from the drawings, the two-piece manifold of the present invention is free of any construction holes—i.e., holes that are used merely for the purpose of permitting the formation of passageways, ports, or the like in the manifold modules. In other words, any opening drilled or otherwise machined into either of the modules is a working opening in the sense that it either provides a passageway for fluid flow, a valve pocket, a threaded bore or hole to enable the modules to be connected, etc. As will be recognized by those skilled in the art, this a clear advantage since it minimizes machining costs, obviates the necessity of having to plug the construction port, and, perhaps most significantly, minimizes the points of leakage out of the manifold.

The foregoing description and examples illustrate selected embodiments of the present invention. In light thereof, variations and modifications will be suggested to one skilled in the art, all of which are in the spirit and purview of this invention.

What is claimed is:

1. A modular valve manifold adapted to be positioned between a main flowline and a pressure sensor to control fluid flow from said main flowline to said pressure sensor, comprising:

a first module, said first module having an instrument face and a peripheral wall, said peripheral wall including a first mating surface, a high pressure transmitter plenum and a low pressure transmitter plenum being formed in said instrument face, a high pressure outlet opening into said high pressure plenum and a low pressure outlet opening into said low pressure plenum;

an equalizer valving system disposed in said first module for selectively controlling fluid communication between said high pressure outlet and said low pressure outlet;

a vent valving system disposed in said first module for selectively venting fluid from said high pressure and low pressure plenums exteriorly of said first module;

a high pressure inlet formed in said first mating face, said high pressure inlet being in open fluid communication with said high pressure outlet, a low pressure inlet being formed in said first mating face, said low pressure inlet being in open fluid communication with said low pressure outlet;

a second module, said second module having a second mating surface adapted to mate with first mating surface on said first module, said second module including a high pressure process fluid inlet and a low pressure process fluid inlet;

a high pressure process fluid outlet being formed in said second mating face, a low pressure process fluid outlet being formed in said second mating face, said high pressure process fluid inlet and said high pressure process fluid outlet being selectively in fluid communication, said low pressure process fluid inlet and said low pressure process fluid outlet being selectively in fluid communication, said high pressure and low pressure process fluid outlets being in register with said high pressure and low pressure inlets, respectively, formed in said first mating face;

a high pressure block valve disposed in said second module for selectively controlling fluid flow from said high pressure process fluid inlet to said high pressure process fluid outlet;

a low pressure block valve disposed in said second module for selectively controlling fluid flow from said low pressure process fluid inlet to said low pressure process fluid outlet;

a seal effecting first fluid-tight communication between said high pressure process fluid outlet and said high pressure inlet, and second fluid-tight communication between said low pressure process fluid outlet, and said low pressure inlet; and a connector selectively securing said first and second modules together, said connector being separate and spaced from structure forming a flow path between said high pressure process fluid outlet and said high pressure fluid inlet or said low pressure process fluid outlet and said low pressure fluid inlet.

2. The manifold of claim 1 wherein said seal includes high pressure and low pressure tubular formations projecting as to one and receiving as to the other of said first module and said second module, said high pressure tubular formation interconnecting said high pressure process fluid outlet and said high pressure inlet, said low pressure tubular formation interconnecting said low pressure process fluid outlet and said low pressure inlet.

3. The manifold of claim 2 wherein each of said tubular formations has a first end and a second end, each of said first ends being received in interference fit in respective first and second bores formed in said high and low pressure process fluid outlets, said second ends being slidably received in respective first and second bores formed in said high and low pressure inlet.

4. The manifold of claim 2 wherein said high pressure process fluid outlet and said high pressure fluid inlet, and said low pressure process fluid outlet and said low pressure inlet define first and second annular grooves, respectively, in surrounding relationship to said first and second tubular formations, respectively, when said first and second modules are connected, a first deformable seal ring being received in said first annular groove, a second deformable seal ring being received in said second annular groove, said connecting means serving to deform said first and second seal rings into fluid-tight engagement with said first and second tubular formations, respectively, said first module and said second module.

5. The manifold of claim 1 wherein said connector includes a threaded bore formed in said first mating surface and said second module has an end face spaced from and generally parallel to said second mating surface, a throughbore extending through said end face and said second mating surface and a threaded bolt extending through said throughbore and threadedly received in said threaded bore in said first mating surface.

6. The manifold of claim 5 wherein there are two of said threaded bores, said throughbores, and said bolts.

7. The manifold of claim 1 wherein said second module includes a high pressure process fluid passageway selectively interconnecting said high pressure process fluid inlet and said high pressure process fluid outlet and a low pressure process fluid passageway selectively connecting said low pressure process fluid inlet and said low pressure process fluid outlet, a high pressure block valve pocket being formed in said second module, said high pressure block valve pocket intersecting said high pressure process fluid passageway, said high pressure block valve being disposed in said high pressure block valve pocket for selectively controlling flow through said high pressure process fluid passageway and a low pressure block valve pocket being formed in said second module and intersecting said low pressure process fluid passageway, said low pressure block valve being disposed in said low pressure block valve pocket for selectively controlling flow through said low pressure process fluid passageway.

8. The manifold of claim 1 wherein said second module includes first and second lobes, said first lobe defining said high pressure process fluid inlet, said second lobe defining said low pressure process fluid inlet.

9. The manifold of claim 7 wherein said second module includes a main body portion defining a top, generally planar surface, said main body portion further defining a first, planar side wall and a second, opposed planar side wall, said first and second side walls forming equal, obtuse angles with said top planar surface, said high pressure block valve pocket being formed in said first side surface, said low pressure block valve pocket being formed in said second side surface.

10. The manifold of claim 1 wherein said equalizer valving system includes at least one equalizer valve pocket formed in said peripheral wall surface, a first passageway providing open fluid communication between said equalizer valve pocket and said high pressure plenum, a second passageway providing open fluid communication between said low pressure plenum and said equalizer valve pocket and an equalizer valve disposed in said valve pocket for controlling fluid communication between said first and second passageways.

11. The manifold of claim 10 wherein said peripheral wall includes a rear surface and first and second, opposed side walls disposed between said rear surface and said first mating surface and there are first and second vent ports formed in said first and second side walls, respectively, said first vent port being in open communication with said first passageway, said second vent port being in open communication with said second passageway.

12. The manifold of claim 11 wherein said first and second vent ports are threaded for threadedly receiving first and second vent fittings, respectively.

13. The manifold of claim 10 wherein said peripheral wall includes first and second opposed side walls, a first equalizer valve pocket being formed in said first side wall, a second equalizer valve pocket being formed in said second side wall, an equalizer passageway extending between and being in open fluid communication with said first and second equalizer valve pockets, a first stub passageway being in open fluid communication with said high pressure plenum and said first equalizer valve pocket, a second stub passageway being in open fluid communication with said low pressure plenum and said second equalizer valve pocket, a first equalizer valve received in said first equalizer valve pocket and a second equalizer valve being received in said second equalizer valve pocket whereby said first equalizer valve controls fluid communication between said high pressure plenum and said equalizer passageway and said second equalizer valve controls fluid communication between said low pressure plenum and said equalizer passageway.

14. The manifold of claim 1 wherein said first module includes a main body segment and a neck body segment, said neck body segment defining a rear surface opposed to said first mating surface, first and second vent ports being formed in said rear surface, said first vent port being connected by a first vent passageway to said high pressure plenum, said second vent port being connected by a second vent passageway to said low pressure plenum, said neck body segment defining a first neck body segment surface and a second neck body segment surface, said first and second neck body segment surfaces being on opposite sides of said neck body segment, a first vent valve pocket being formed in said first neck body segment surface, a second vent valve pocket being formed in said second neck segment surface, said first vent valve pocket intersecting said first vent passageway, said second vent valve pocket intersecting said second vent passageway, a first vent valve being disposed in said first vent valve pocket for controlling flow through said first vent passageway, a second vent valve being disposed in said second vent valve pocket for controlling flow through said second vent passageway.

15. The manifold of claim 14 wherein said first and second vent passageways have first runs extending from said first and second vent ports, which are substantially parallel to one another and to said instrument face and second runs, which are generally parallel to one another and transverse to said first runs.

16. The manifold of claim 15 wherein said high pressure inlet is connected to said high pressure outlet by a first high pressure passageway having a first run portion and a second run portion, said first run portion of said high pressure passageway being generally coaxial with said first run of said first vent passageway, said low pressure inlet being connected to said low pressure outlet by a low pressure passageway, said low pressure passageway having a first run portion and a second run portion, said first run portion of said low pressure passageway being generally coaxial with said first run of said second vent passageway.

17. The manifold of claim 14 wherein said instrument face is planar and forms a common surface over said main body segment and said neck body segment and said first and second neck segment surfaces form equal, obtuse angles with said common surface.

18. The manifold of claim 1, further including a blanking plate for securing to said second module when said first and second modules are separated, said blanking plate having a third mating surface adapted to mate with said second mating surface, said blanking plate including a high pressure relief outlet formed in said third mating face and a low pressure relief outlet formed in said third mating face, said high pressure and low pressure relief outlet being in open communication with a relief passageway, said relief passageway being in open communication with a relief outlet, said relief outlet being adapted to receive a pressure relief valve, said sealing means effecting first, fluid-tight communication between said high pressure process fluid outlet and said high pressure relief outlet and second fluid-tight communication between said low pressure process fluid outlet and said low pressure relief outlet, said connector securing said blanking plate to said second module.

19. The manifold of claim 1 wherein said second module includes a first flange having a first flange surface coplanar with said second mating surface and an opposed second flange having a second flange surface coplanar with said second mating surface, each of said first and second flanges having at least one throughbore passing through said first and second flange surfaces and said first module has a third flange having a third flange surface coplanar with said first mating surface and a fourth flange having a fourth flange surface coplanar with said first mating surface, each of said third and fourth flanges having at least one threaded hole therein and wherein threaded bolts are received through said bolt holes in said first and second flanges and are threadedly received in said threaded bores in said third and fourth flanges, respectively, to secure said first and second modules together.

20. The manifold of claim 19 wherein each of said first and second flanges is provided with a plurality of throughbores and each of said third and fourth flanges is provided with a plurality of threaded bores, respective ones of said throughbores in said first and second flanges being in register with respective ones of said threaded bores in said third and fourth flanges, respectively.

21. A valve module adapted to be attached to a main flowline containing a flow restrictor providing a high pressure source of fluid and a low pressure source of fluid on opposed sides of said flow restrictor, comprising:
   a valve body providing a first mating surface, said valve body further including a high pressure process fluid inlet to receive fluid from said high pressure source of fluid and a low pressure process fluid inlet to receive fluid from said low pressure source of fluid;
   a high pressure process fluid outlet being formed in said first mating surface, a low pressure process fluid outlet being formed in said first mating surface, said high pressure process fluid inlet and said high pressure process fluid outlet being selectively in fluid communication, said low pressure process fluid inlet and said low pressure process fluid outlet being selectively in fluid communication;
   a high pressure block valve disposed in said body for selectively controlling fluid flow from said high pressure process fluid inlet to said high pressure process fluid outlet;
   a low pressure block valve disposed in said body for selectively controlling fluid flow from said low pressure process fluid inlet to said low pressure process fluid outlet; and
   a blanking plate selectively secured to said valve body, said blanking plate having a second mating surface adapted to mate with said first mating surface on said valve body, said blanking plate including a high pressure relief outlet formed in said second mating surface and a low pressure relief outlet formed in said second mating surface, said high pressure and low pressure relief outlets being in open communication with a pressure relief passageway, said pressure relief passageway being in open communication with a vent, said vent being adapted to receive a pressure relief valve, a first seal to effect first, fluid-tight communication between said high pressure process fluid outlet and said high pressure relief outlet and a second seal to effect second fluid-tight communication between said low pressure process fluid outlet and said low pressure relief outlet and a connector selectively securing said blanking plate to said body.

22. The modular valve manifold of claim 1 wherein said first and second modules are free of construction holes.

23. A modular valve manifold adapted to be positioned between a main flowline and a pressure sensor to control fluid flow from said main flowline to said pressure sensor, comprising:
   a first module, said first module having an instrument face and a peripheral wall, said peripheral wall including a first mating surface, a high pressure transmitter plenum and a low pressure transmitter plenum being formed in said instrument face, a high pressure outlet opening into said high pressure plenum and a low pressure outlet opening into said low pressure plenum;
   an equalizer valving system disposed in said first module for selectively controlling fluid communication between said high pressure outlet and said low pressure outlet, said equalizer valving system including at least one equalizer valve pocket formed in said peripheral wall, a first passageway providing open fluid communication between said equalizer valve pocket and said high pressure plenum, a second passageway providing open fluid communication between said low pressure plenum and said equalizer valve pocket and an equalizer valve disposed in said valve pocket for controlling fluid communication between said first and second passageways;
   a vent valving system disposed in said first module for selectively venting fluid from said high pressure and low pressure plenums exteriorly of said first module;
   a high pressure inlet formed in said first mating face, said high pressure inlet being in open fluid communication with said high pressure outlet, a low pressure inlet being formed in said first mating face, said low pressure inlet being in open fluid communication with said low pressure outlet;
   a second module, said second module having a second mating surface adapted to mate with first mating surface on said first module, said second module including a high pressure process fluid inlet and a low pressure process fluid inlet;
   a high pressure process fluid outlet being formed in said second mating face, a low pressure process fluid outlet being formed in said second mating face, said high pressure process fluid inlet and said high pressure process fluid outlet being selectively in fluid communication, said low pressure process fluid inlet and said low pressure process fluid outlet being selectively in fluid communication, said high pressure and low pressure process fluid outlets being in register with said high pressure and low pressure inlets, respectively, formed in said first mating face;
   a high pressure block valve disposed in said second module for selectively controlling fluid flow from said high pressure process fluid inlet to said high pressure process fluid outlet;
   a low pressure block valve disposed in said second module for selectively controlling fluid flow from said low pressure process fluid inlet to said low pressure process fluid outlet;
   a seal effecting first fluid-tight communication between said high pressure process fluid outlet and said high pressure inlet, and second fluid-tight communication between said low pressure process fluid outlet, and said low pressure inlet; and
   a connector selectively securing said first and second modules together, said connector being separate and spaced from structure forming a flow path between said high pressure process fluid outlet and said high pressure fluid inlet or said low pressure process fluid outlet and said low pressure fluid inlet.

24. The manifold of claim 23 wherein said seal includes high pressure and low pressure tubular formations projecting as to one and receiving as to the other of said first module and said second module, said high pressure tubular formation interconnecting said high pressure process fluid outlet and said high pressure inlet, said low pressure tubular formation interconnecting said low pressure process fluid outlet and said low pressure inlet.

25. The manifold of claim 24 wherein each of said tubular formations has a first end and a second end, each of said first ends being received in interference fit in respective first and second bores formed in said high and low pressure process fluid outlets, said second ends being slidably received in respective first and second bores formed in said high and low pressure inlet.

26. The manifold of claim 24 wherein said high pressure process fluid outlet and said high pressure fluid inlet, and said low pressure process fluid outlet and said low pressure inlet define first and second annular grooves, respectively, in surrounding relationship to said first and second tubular formations, respectively, when said first and second modules are connected, a first deformable seal ring being received in said first annular groove, a second deformable seal ring being received in said second annular groove, said connecting means serving to deform said first and second seal rings into fluid-tight engagement with said first and second tubular formations, respectively, said first module and said second module.

27. The manifold of claim 23 wherein said connector includes a threaded bore formed in said first mating surface and said second module has an end face spaced from and generally parallel to said second mating surface, a throughbore extending through said end face and said second mating surface and a threaded bolt extending through said throughbore and threadedly received in said threaded bore in said first mating surface.

28. The apparatus of claim 27 wherein there are two of said threaded bores, said throughbores, and said bolts.

29. The manifold of claim 23 wherein said second module includes a high pressure process fluid passageway selectively interconnecting said high pressure process fluid inlet and said high pressure process fluid outlet and a low pressure process fluid passageway selectively connecting said low pressure process fluid inlet and said low pressure process fluid outlet, a high pressure block valve pocket being formed in said second module, said high pressure block valve pocket intersecting said high pressure process fluid passageway, said high pressure block valve being disposed in said high pressure block valve pocket for selectively controlling flow through said high pressure process fluid passageway and a low pressure block valve pocket being formed in said second module and intersecting said low pressure process fluid passageway, said low pressure block valve being disposed in said low pressure block valve pocket for selectively controlling flow through said low pressure process fluid passageway.

30. The manifold of claim 23 wherein said second module includes first and second lobes, said first lobe defining said high pressure process fluid inlet, said second lobe defining said low pressure process fluid inlet.

31. The manifold of claim 29 wherein said second module includes a main body portion defining a top, generally planar surface, said main body portion further defining a first, planar side wall and a second, opposed planar side wall, said first and second side walls forming equal, obtuse angles with said top planar surface, said high pressure block valve pocket being formed in said first side surface, said low pressure block valve pocket being formed in said second side surface.

32. The manifold of claim 23 wherein said peripheral wall includes a rear surface and first and second, opposed side walls disposed between said rear surface and said first mating surface and there are first and second vent ports formed in said first and second side walls, respectively, said first vent port being in open communication with said first passageway, said second vent port being in open communication with said second passageway.

33. The manifold of claim 32 wherein said first and second vent ports are threaded for threadedly receiving first and second vent fittings, respectively.

34. The manifold of claim 23 wherein said peripheral wall includes first and second opposed side walls, a first equalizer valve pocket being formed in said first side wall, a second equalizer valve pocket being formed in said second side wall, an equalizer passageway extending between and being in open fluid communication with said first and second equalizer valve pockets, a first stub passageway being in open fluid communication with said high pressure plenum and said first equalizer valve pocket, a second stub passageway being in open fluid communication with said low pressure plenum and said second equalizer valve pocket, said first and second stub passageways being generally transverse to said equalizer passageway, a first equalizer valve received in said first equalizer valve pocket and a second equalizer valve being received in said second equalizer valve pocket whereby said first equalizer valve controls fluid communication between said high pressure plenum and said equalizer passageway and said second equalizer valve controls fluid communication between said low pressure plenum and said equalizer passageway.

35. The manifold of claim 23 wherein said first module includes a main body segment and a neck body segment, said neck body segment defining a rear surface opposed to said first mating surface, first and second vent ports being formed in said rear surface, said first vent port being connected by a first vent passageway to said high pressure plenum, said second vent port being connected by a second vent passageway to said low pressure plenum, said neck body segment defining a first neck body segment surface and a second neck body segment surface, said first and second neck body segment surfaces being on opposite sides of said neck body segment, a first vent valve pocket being formed in said first neck body segment surface, a second vent valve pocket being formed in said second neck segment surface, said first vent valve pocket intersecting said first vent passageway, said second vent valve pocket intersecting said second vent passageway, a first vent valve being disposed in said first vent valve pocket for controlling flow through said first vent passageway, a second vent valve being disposed in said second vent valve pocket for controlling flow through said second vent passageway.

36. The manifold of claim 35 wherein said first and second vent passageways have first runs extending from said first and second vent ports, which are substantially parallel to one another and to said instrument face and second runs, which are generally parallel to one another and transverse to said first runs.

37. The manifold of claim 36 wherein said high pressure inlet is connected to said high pressure outlet by a first high pressure passageway having a first run portion and a second run portion, said first run portion of said high pressure passageway being generally coaxial with said first run of said first vent passageway, said low pressure inlet being connected to said low pressure outlet by a low pressure passageway, said low pressure passageway having a first run portion and a second run portion, said first run portion of said low pressure passageway being generally coaxial with said first run of said second vent passageway.

38. The manifold of claim 35 wherein said instrument face is planar and forms a common surface over said main body segment and said neck body segment and said first and second neck segment surfaces form equal, obtuse angles with said common surface.

39. The manifold of claim 23, further including a blanking plate for securing to said second module when said first and second modules are separated, said blanking plate having a third mating surface adapted to mate with said second mating surface, said blanking plate including a high pressure relief outlet formed in said third mating face and a low pressure relief outlet formed in said third mating face, said high pressure and low pressure relief outlet being in open communication with a relief passageway, said relief passageway being in open communication with a relief outlet, said relief outlet being adapted to receive a pressure relief valve, said sealing means effecting first, fluid-tight communication between said high pressure process fluid outlet and said high pressure relief outlet and second fluid-tight communication between said low pressure process fluid outlet and said low pressure relief outlet, said connector securing said blanking plate to said second module.

40. The manifold of claim 23 wherein said second module includes a first flange having a first flange surface coplanar with said second mating surface and an opposed second flange having a second flange surface coplanar with said second mating surface, each of said first and second flanges having at least one throughbore passing through said first and second flange surfaces and said first module has a third flange having a third flange surface coplanar with said first mating surface and a fourth flange having a fourth flange surface coplanar with said first mating surface, each of said third and fourth flanges having at least one threaded hole therein and wherein threaded bolts are received through said bolt holes in said first and second flanges and are threadedly received in said threaded bores in said third and fourth flanges, respectively, to secure said first and second modules together.

41. The manifold of claim 40 wherein each of said first and second flanges is provided with a plurality of throughbores and each of said third and fourth flanges is provided with a plurality of threaded bores, respective ones of said throughbores in said first and second flanges being in register with respective ones of said threaded bores in said third and fourth flanges, respectively.

42. The manifold of claim 23 wherein said first and second modules are free of construction holes.

* * * * *